US009792041B2

(12) United States Patent
Toebes et al.

(10) Patent No.: US 9,792,041 B2
(45) Date of Patent: *Oct. 17, 2017

(54) DEVICE, METHODS, AND USER INTERFACE FOR PROVIDING OPTIMIZED ENTRY OF ALPHANUMERIC TEXT

(71) Applicant: Cisco Technology, Inc., San Jose, CA (US)

(72) Inventors: John A. Toebes, Cary, NC (US); Ilya N. Slain, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 339 days.

This patent is subject to a terminal disclaimer.

(21) Appl. No.: 14/611,549

(22) Filed: Feb. 2, 2015

(65) Prior Publication Data

US 2015/0149949 A1   May 28, 2015

Related U.S. Application Data

(63) Continuation of application No. 14/174,353, filed on Feb. 6, 2014, now Pat. No. 8,977,321, which is a continuation of application No. 13/672,201, filed on Nov. 8, 2012, now Pat. No. 8,666,457, which is a continuation of application No. 13/280,948, filed on (Continued)

(51) Int. Cl.
*G06F 3/0488* (2013.01)
*G06F 3/0482* (2013.01)
*G06F 3/0484* (2013.01)
*G06F 3/02* (2006.01)
*G06F 3/023* (2006.01)

(52) U.S. Cl.
CPC ............ *G06F 3/04886* (2013.01); *G06F 3/02* (2013.01); *G06F 3/0236* (2013.01); *G06F 3/0482* (2013.01); *G06F 3/0484* (2013.01); *H04M 2250/70* (2013.01)

(58) Field of Classification Search
CPC .. G06F 3/04886; G06F 3/0482; G06F 3/0484; G06F 3/02; G06F 3/0236; H04M 2250/70
See application file for complete search history.

(56) References Cited

U.S. PATENT DOCUMENTS 5,475,741 A   12/1995 Davis et al.
5,661,476 A    8/1997 Wang et al.
(Continued)

FOREIGN PATENT DOCUMENTS

WO    WO00/04439    1/2000    ............. G06F 3/023

*Primary Examiner* — Brandon Miller
(74) *Attorney, Agent, or Firm* — Baker Botts L.L.P.

(57) ABSTRACT

The present invention includes a device, method, and user interface for providing optimized entry of alphanumeric text. In one form, a method for providing selectable characters within a user interface includes determining an operating mode of a communication device and receiving an input associated with a selected input key. The method determines a group of characters associated with the selected key based on the operating mode and displays the group of characters within the user interface. The user interface may display a first character of the group of characters within a first portion of the user interface and the group of characters proximal to the first character within a second portion of the user interface.

17 Claims, 4 Drawing Sheets

Related U.S. Application Data

Oct. 25, 2011, now Pat. No. 8,311,588, which is a continuation of application No. 12/577,544, filed on Oct. 12, 2009, now Pat. No. 8,078,231, which is a continuation of application No. 11/101,918, filed on Apr. 8, 2005, now Pat. No. 7,603,142, which is a continuation of application No. 09/741,690, filed on Dec. 19, 2000, now Pat. No. 6,882,869.

(56) References Cited

U.S. PATENT DOCUMENTS

| | | |
|---|---|---|
| 5,677,949 A | 10/1997 | Macor |
| 5,708,561 A | 1/1998 | Huilgot et al. |
| 5,818,437 A | 10/1998 | Grover et al. |
| 5,841,849 A | 11/1998 | Macor |
| 5,870,683 A | 2/1999 | Wells et al. |
| 5,952,942 A | 9/1999 | Balakrishnan et al. |
| 5,977,887 A | 11/1999 | Grimmett |
| 6,009,444 A | 12/1999 | Chen |
| 6,046,732 A | 4/2000 | Nishimoto |
| 6,049,796 A | 4/2000 | Siltonen et al. |
| 6,052,070 A | 4/2000 | Kivela et al. |
| 6,098,086 A | 8/2000 | Krueger et al. |
| 6,101,461 A * | 8/2000 | Ukigawa .............. G06F 3/018 704/10 |
| 6,125,287 A | 9/2000 | Cushman et al. |
| 6,130,628 A | 10/2000 | Schneider-Hufschmidt et al. |
| 6,154,758 A | 11/2000 | Chiang |
| 6,169,538 B1 | 1/2001 | Nowlan et al. |
| 6,169,911 B1 | 1/2001 | Wagner et al. |
| 6,204,848 B1 | 3/2001 | Nowlan et al. |
| 6,212,412 B1 | 4/2001 | Rogers et al. |
| 6,256,516 B1 | 7/2001 | Wagner et al. |
| 6,275,612 B1 | 8/2001 | Imolo |
| 6,282,435 B1 | 8/2001 | Wagner et al. |
| 6,295,052 B1 * | 9/2001 | Kato .............. G06F 3/04886 341/21 |
| 6,341,228 B1 | 1/2002 | Hubbe et al. |
| 6,370,363 B1 | 4/2002 | Fukuzato |
| 6,411,822 B1 | 6/2002 | Kraft |
| 6,442,270 B1 | 8/2002 | Simon et al. |
| 6,459,390 B1 | 10/2002 | Kim |
| 6,473,006 B1 | 10/2002 | Yu et al. |
| 6,487,424 B1 * | 11/2002 | Kraft .............. G06F 3/0236 345/157 |
| 6,510,235 B1 | 1/2003 | Shin et al. |
| 6,535,749 B1 | 3/2003 | Iwata et al. |
| 6,567,549 B1 | 5/2003 | Marianetti et al. |
| 6,618,586 B2 | 9/2003 | Inoue |
| 6,646,573 B1 | 11/2003 | Kushler et al. |
| 6,674,372 B1 | 1/2004 | Ouyang |
| 6,708,214 B1 * | 3/2004 | La Fleur .......... G06F 17/30899 707/999.006 |
| 6,735,516 B1 | 5/2004 | Manson |
| 6,741,235 B1 | 5/2004 | Goren |
| 6,757,372 B1 | 6/2004 | Dunlap et al. |
| 6,766,179 B1 | 7/2004 | Shlau et al. |
| 6,822,585 B1 | 11/2004 | Ni et al. |
| 6,847,311 B2 | 1/2005 | Li |
| 6,865,404 B1 | 3/2005 | Tikkala et al. |
| 6,882,869 B1 * | 4/2005 | Toebes .............. G06F 3/0236 345/157 |
| 7,050,046 B1 | 5/2006 | Park et al. |
| 7,603,142 B1 * | 10/2009 | Toebes .............. G06F 3/0236 345/157 |
| 8,078,231 B2 * | 12/2011 | Toebes .............. G06F 3/0236 455/556.2 |
| 8,311,588 B2 * | 11/2012 | Toebes .............. G06F 3/0236 455/556.2 |
| 8,666,457 B2 * | 3/2014 | Toebes .............. G06F 3/0236 455/556.2 |
| 8,977,321 B2 * | 3/2015 | Toebes .............. G06F 3/0236 455/556.2 |

* cited by examiner

FIG. 4

DEVICE, METHODS, AND USER INTERFACE FOR PROVIDING OPTIMIZED ENTRY OF ALPHANUMERIC TEXT

CROSS-REFERENCE TO RELATED APPLICATIONS

This application is a continuation of U.S. application Ser. No. 14/174,353 filed Feb. 6, 2014 and entitled Device, Methods, and User Interface for Providing Optimized Entry of Alphanumeric Text" which is a continuation of Ser. No. "13/672,201 filed Nov. 8, 2012 and entitled "Device, Methods, and User Interface for Providing Optimized Entry of Alphanumeric Text", now U.S. Pat. No. 8,666,457 issued Mar. 4, 2014 which is a continuation of U.S. application Ser. No. 13/280,948 filed Oct. 25, 2011 and entitled "Device, Methods, and User Interface for Providing Optimized Entry of Alphanumeric Text" now U.S. Pat. No. 8,311,588 issued Nov. 13, 2012 which is a continuation of U.S. application Ser. No. 12/577,544 filed Oct. 12, 2009 and entitled "Device, Methods, and User Interface for Providing Optimized Entry of Alphanumeric Text", now U.S. Pat. No. 8,078,231 which is a continuation of U.S. application Ser. No. 11/101,918 filed Apr. 8, 2005 and entitled "Device, Methods, and User Interface for Providing Optimized Entry of Alphanumeric Text", now U.S. Pat. No. 7,603,142 which is a continuation of U.S. application Ser. No. 09/741,690 filed Dec. 19, 2000 and entitled "Device, Methods, and User Interface for Providing Optimized Entry of Alphanumeric Text", now U.S. Pat. No. 6,882,869, issued Apr. 19, 2005.

TECHNICAL FIELD OF THE INVENTION

The present invention generally relates to the field of communication, and more particularly to a device, method and user interface for providing optimized entry of alphanumeric text.

BACKGROUND OF THE INVENTION

Current technologies exist for inputting characters within user interfaces which have a limited number of keys for entering character strings. One such solution presently used includes a T9 input where the user interface guesses the best match of possible characters based on a stored list of words or names. For example, a user may enter a character within a user interface and a selectable list of names starting with the character may be displayed within the user interface.

Another conventional solution deployed by present systems includes "chording", a method in which every letter takes two keystrokes to input a character. For example, to enter a character "A" a user would have to press the "2" key and then any key on the top row (i.e. 1,2,3). Likewise, to enter a "C" a user would press the "2" key and then any key from the third row (i.e. 7,8,9). Other variations of chording may include entering characters based on position by selecting the appropriate number representing the characters position (i.e. 1,2,3 or 4).

SUMMARY OF THE INVENTION

In accordance with the teachings of the present invention, a device, methods, and user interface for providing optimized entry of alphanumeric text are disclosed. According to one aspect of the invention, a method for providing selectable characters within a user interface is disclosed. The method includes determining an operating mode of a communication device and receiving an input associated with a selected input key. The method also includes determining a group of characters associated with the selected key based on the operating mode and displaying the group of characters within the user interface.

According to another aspect of the invention, a communication device is disclosed. The communication device includes a processor module operable to determine a group of characters associated with an operating mode in response to an input and a memory coupled to the processor for storing information associated with displaying the group of characters. The device also includes a user interface operable to display selectable characters associated with the operating mode and an input device operably coupled to the user interface. The input device provides an input to select the group of characters.

It is a technical advantage of certain embodiments of the invention to provide a simplified user interface for inputting character strings. The user interface requires minimal input by a user to display and select alphanumeric text for selecting communication addresses. For example, one embodiment of the invention provides a cursor which may be substantially centered about a group of selectable characters. The group of characters may be displayed in a segmented manner to enhance viewability of alphanumeric text within a user interface. The user interface may display a group of characters based on a selected key and further display a bubble help cursor positioned relative to a highlighted character within the group of characters. The bubble help cursor includes the highlighted character and a user may scroll the group of characters using a bubble help cursor that displays the next or previous character within the group of characters.

It is a further technical advantage of certain embodiments of the invention to provide a user interface having one or more display modes for displaying characters within a user interface. One such display mode may include displaying a group of characters horizontally within a user interface and further displaying a selection cursor centered over the group of characters. The cursor displays a highlighted character within the group of characters and a user may scroll the group of characters using the cursor to display selectable characters within the group of characters. In this manner, optimized viewing of selectable characters may be obtained allowing efficient access to alphanumeric text associated with a selected key.

It is another technical advantage of certain embodiments of the invention to provide a learned time-out sequence for highlighting and selecting characters displayed within a user interface. The time-out sequence may be based on a algorithm that calculates a user specific utilization period based on user interaction with the user interface. The time-out sequence may adapt to a specific user and calculate an interaction period associated with the user interface based on a user selecting and/or scrolling characters or alphanumeric text displayed within the user interface.

It is a further technical advantage of certain embodiments of the invention to provide a user interface which displays alphanumeric text based on a communication mode. The communication device may be operated in several different communication modes using different communication reference types or protocols which may include a session initiation protocol (SIP), Internet Protocol (IP), address domain names, telephone numbers, Uniform Resource Locators (URLs), Uniform Resource Identifiers (URIs), or any other protocol or communication reference type. Alphanumeric text may be displayed within a user interface based on a selected mode providing a user access to mode specific characters for selecting communication addresses.

Other technical advantages are readily apparent to one skilled in the art from the attached figures, description, and claims.

BRIEF DESCRIPTION OF THE DRAWINGS

FIG. 4 illustrates several display modes for displaying alphanumeric text within the user interface; .

DETAILED DESCRIPTION OF THE INVENTION

A communication device such as a network phone, cellular phone, SIP phone, etc. may include a user interface operable to display alphanumeric text representing communication addresses such as telephone numbers, .URL references, network addresses or other communication addresses or references for initiating communication with a network. One embodiment of a communication device may include a user interface and a keypad that provides access to selectable characters which may include alphanumeric text. The communication device may be operated in one or more modes such as a conventional analog mode, a voice-over-URL mode, a URL-over-voice mode, a URL mode, or other modes which may be used by communication devices. As such, each key within the keypad may be associated with a group of selectable characters which are displayable based on an operating mode of the communication device. Alphanumeric text for an operating mode is displayable to a user in a visually efficient manner allowing a user to scroll, identify, manage, author, etc. alphanumeric text via a user interface which may have limited input capabilities.

The communication device includes a user interface for displaying alphanumeric text based on a communication mode in response to selecting a key. For example, a user may want to enter a character, such as a period (e.g. ".") as a portion of a URL communication address. As such, the communication device may receive an input from the user via a reduced set keypad (e.g. 10-key keypad) and display a group of characters based on the selected key and a communication mode. In one form, the group of characters may be horizontally displayed and may include a cursor substantially centered over the horizontally displayed group of characters. A user may scroll the group of characters and the cursor may update and display the next character within the group of characters. In this manner, a communication device may display alphanumeric text in a visually efficient manner to allow a user to scroll and select a character from a group of characters with minimal input and/or navigation between characters and/or operating modes of a communication device.

Figure 1:
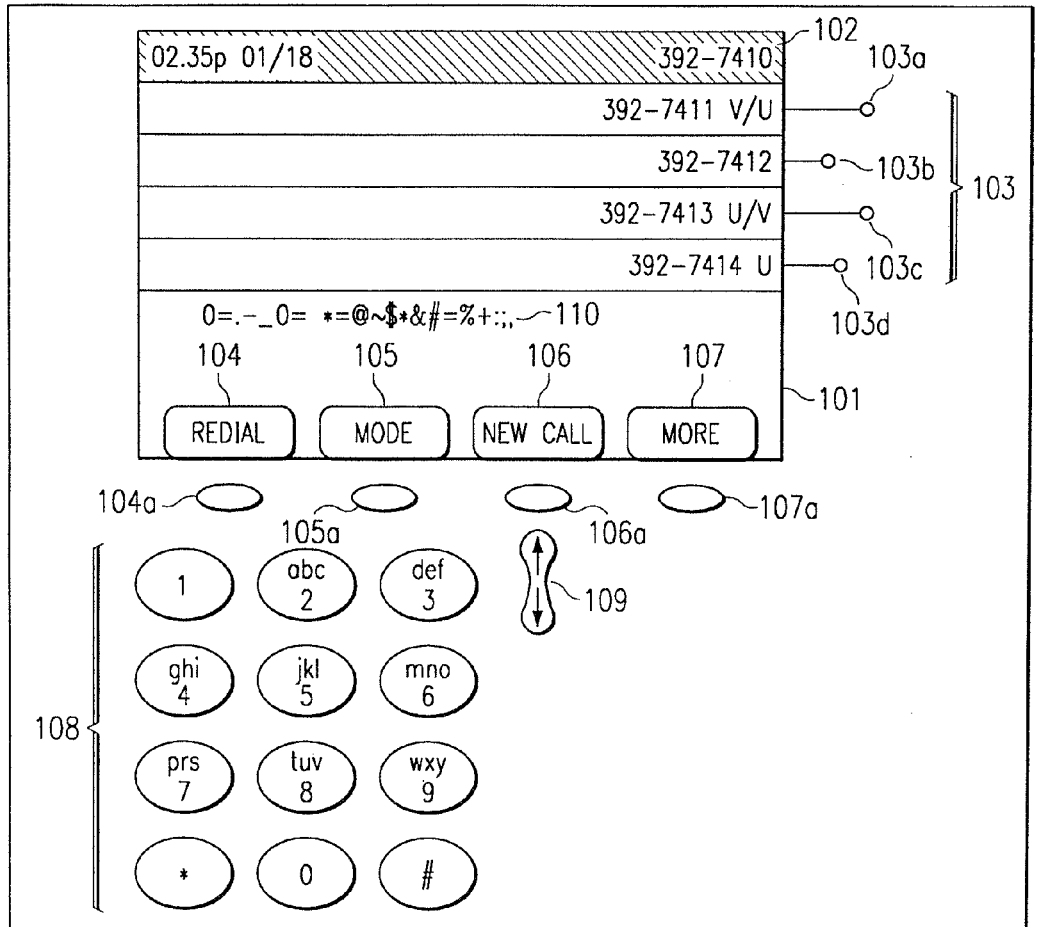
FIG. 1 illustrates one embodiment of a communication device having selectable operating modes according to teachings of the present invention.

FIG. 1 illustrates a communication device having selectable operating modes. The communication device, shown generally at 100, includes a user interface 101 for displaying information such as communication addresses, names, alphanumeric text, soft buttons, and the like. User interface 101 includes several selectable entries 103 which may display communication addresses such as telephone numbers and an associated communication mode. Each selectable entry may include an associated selection button operable to allow a user to select a communication address entry. Communication device 100 also includes a status line 110 for displaying alphanumeric text based on an operating mode of communication device 100. Communication device 100 also includes a display line 102 for displaying a currently selected communication address.

User interface 101 also includes a plurality of soft-keys having associated selection buttons. For example, user interface 101 may display a redial soft-key 104 and a selection button 104a, a mode soft-key 105 and a selection button 105a, a new call soft-key 106 and a selection button 106a, and a more soft-key 107 and a selection button 107a to display additional soft-keys and associated functions. For example, soft-key may be used to display several different types of selectable functions which may be accessed and displayed within user interface 101 and navigated by selecting an associated function button. In this manner, several functions associated with communication device 100 may be accessed and selected by a user.

Communication device 100 also includes a keypad 108, which includes a plurality of keys for providing access to alphanumeric text. For example, the "2" key may provide access to the characters "a, b, c, 11 the "3" key may provide access to the characters "d, e, f" etc. Each key may provide access to alphanumeric text based on an operating mode of communication device 100 thereby allowing specific groups of characters to be associated with a selectable key. In this manner, a numeric keypad having a group of alphanumeric text associated-with each key may be used by communication device 100. Communication device 100 further includes a scroll button 109 operable to scroll information displayed within user interface 101.

During use, a user may select an operating mode, such as a desired communication mode, and author a communication address using alphanumeric text associated with selectable keys within keypad 108. For example, a voice-over-URL mode ("V/U") and a horizontal display mode may be selected for authoring communication addresses using user interface 101. For example, user interface 101 may horizontally display the characters "a, b, c" in response to a user selecting the "2" key on keypad 108. Communication device 100 may also highlight a character within the displayed group of characters to identify a selectable character within the group of characters. A user may then select the "2" key or scroll button 109 to access an adjacent character within the group of characters displayed within user interface 101.

In one embodiment, communication device 100 may calculate a time-out period associated with a user interacting with keypad 108. For example, a user may select a key within keypad 108 and further select the same key to access one of the characters within the group of characters displayed within user interface 101. As a user repeatedly selects the same key, a time-interval may be determined between successive key selections and a time period may be calculated using an algorithm. As such, communication device 100 may "learn" a time-out period for the current user and automatically scroll, select, update, highlight, etc. characters displayed within user interface 101 thereby reducing input required by a user.

For example, a user may typically scroll a displayed character after a predetermined period of time (e.g., average scroll time interval is 1.5 seconds). As such, communication device 100 may determine the amount of time a user takes to scroll a character and may automatically scroll to the next character for a user based on a time-out period for the user elapsing. In one embodiment, communication device 100 may use a statistical analysis to calculate a time-out period for specific users. A time-out period may be stored within a parameter identifying a specific user.

Upon a user providing minimal interaction with communication device 100, a parameter associated with the current user may be identified and used to provide automatic entry, selection, scrolling, access, etc. of alphanumeric text displayed within user interface 101. For example, one or more users may have access to communication device 100. Communication device 100 using learned time-out period for scrolling, selecting, entering, etc. alphanumeric text and may determine a parameter having a time-out period for one of the plurality of users based on the periodicity of the user inputting, scrolling, selecting, interacting, etc. with communication device 100. In one embodiment, a display mode for displaying characters within user interface 101 may be provided. A user may select a horizontal mode for displaying alphanumeric text within user interface 101. Selectable characters may be horizontally displayed based on a user selecting a key within key pad 108. A cursor may also be displayed and positioned over the group of characters in a substantially centered manner. The cursor may display a highlighted character within the group of characters and may update as a user scrolls the group of characters. In this manner, a cursor may be used as a "bubble-help" cursor providing visually efficient access to selectable characters within user interface 101.

Figure 2:
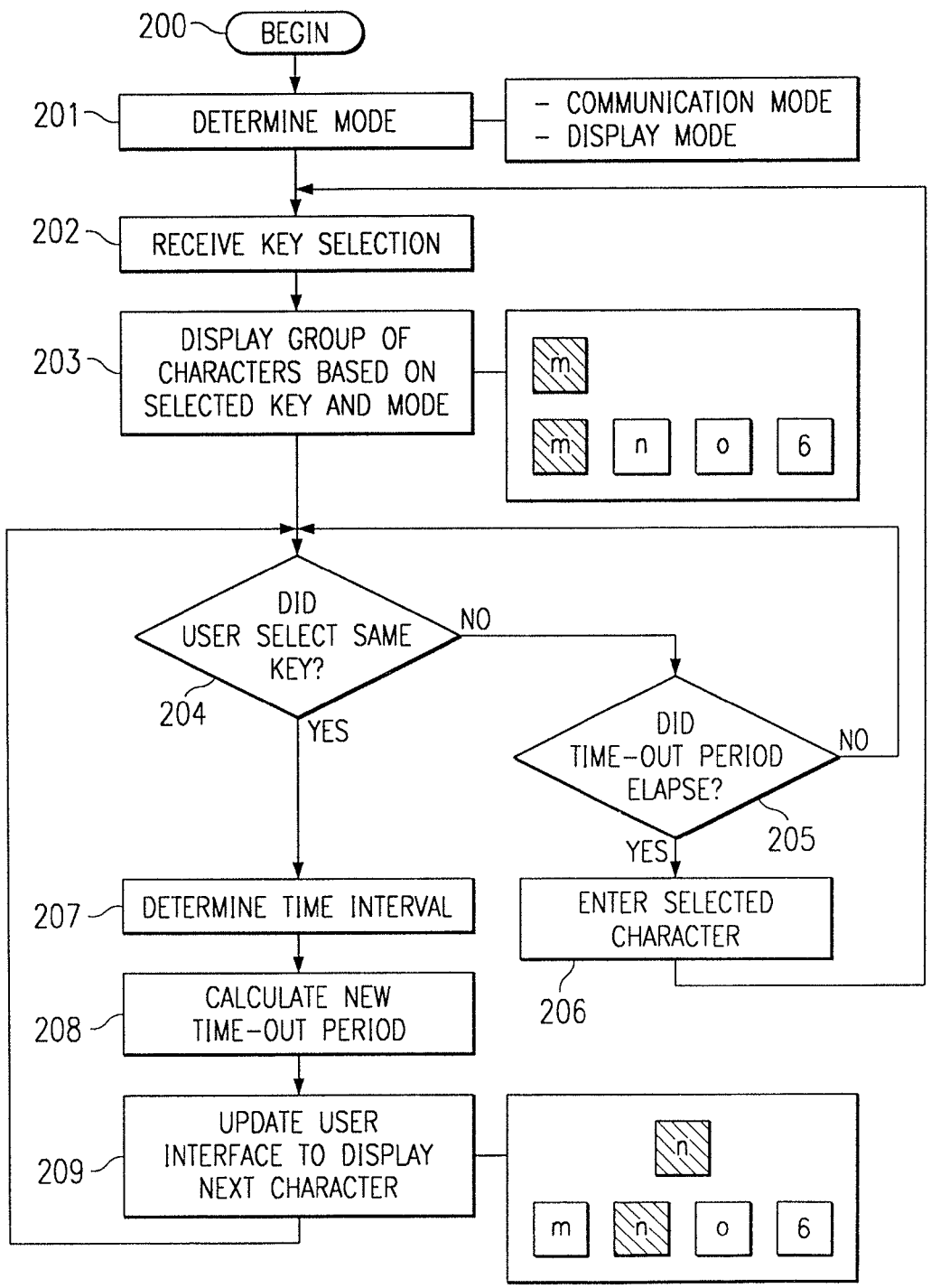
FIG. 2 illustrates one embodiment of a flow diagram of a method for displaying alphanumeric text within a user interface of the communication device.

FIG. 2 illustrates a flow diagram of a method for displaying alphanumeric text within a user interface of a communication device. The method may be deployed using the communication device illustrated in FIG. 1 or other devices, systems, user interfaces, etc. which may use the method of FIG. 2. The method begins generally at step 200. At step 201, the method determines a mode associated with operating a communication device. For example, a communication mode may be selected for accessing alphanumeric text which may be specific for that mode. In other embodiments, a display mode may be determined such as vertical display mode, horizontal display mode,—horizontal segmented display mode, horizontal segmented with active positionable cursor display mode, or any combination of operating modes for accessing selectable alphanumeric text. Although mode selection at step 201 contemplates an initial determination, the user or device 100 can change the mode on a character-by-character basis. For example, a user can select an uppercase mode on a per character basis. Also device 100 can automatically adjust the input mode by recognizing the context of the entry. For example, when in URL mode, device 100 may recognize—that the user is entering an IP address, and automatically set the mode accordingly. This change of mode may be done automatically or manually before or during the input of an entry in device 100.

Upon determining a mode, the method then proceeds to step 202 where the method receives an input in response to selecting a key. For example, a user may select a key on a keypad corresponding to the "6" key. This key has multiple associated characters. If the user selects a key with only one associated character, such as the "1" key, then the method may enter that character immediately and wait to receive the next key selection at step 202.

If the selected key is associated with more than one character, the method proceeds to step 203 where a group of characters associated with the selected key is displayed within a user interface based on the determined mode. For example, a communication device may have a default display mode for displaying characters corresponding to a selected key. A group of characters corresponding with a selected key may be displayed based on the default display mode. For example, if the key 6 is selected the group "m n o 6" may be displayed based on the selected key and a display mode. In one embodiment, characters may be displayed in a horizontal manner with a positionable cursor displayed above the group of characters. The cursor may include the first character within the group of characters associated with the selected key.

Upon displaying the characters, the method proceeds to step 204 where the method determines if a user selects the same key. In the example above, the character "m" of the group of characters may be highlighted and a user may select the 6 key or a scroll button to move the cursor to an adjacent character within the group of characters. If a user selects the same key or a scroll button, the method proceeds to step 207 where the method determines a time interval between the first time the 6 key was selected and the second time the 6 key was selected. The method then proceeds to step 208 where the method calculates a new time-out period based on the determined time interval. For example, the method may employ an algorithm to calculate an average time-out period for the user. The method then proceeds to step 209 where the method updates the user interface in response to the selected key. For example, the next character within the group of characters may be highlighted and the cursor may be updated to display the next character. The method then proceeds to step 204 where the method determines if the same key was selected.

In one embodiment, a cursor may be positioned along side of a group of characters vertically displayed. The cursor may be centered along the group of characters and may display a highlighted character within the group of characters. As such, a user may access, scroll, select, interact, etc. the group of characters displaying within the user interface.

If at step 204 the user does not select the same key, the method proceeds to step 205 where the method determines if an input time-out period has elapsed. For example, a time-out period of 1.2 seconds may elapse without a user selecting a character. If the time-out period has elapsed, the method proceeds to step 206 where the highlighted character is entered and then to step 202 where the method repeats. If at step 205 the time-out period did not elapse, the method proceeds to step 204 where the method determines if the same input key is selected.

Figure 3:
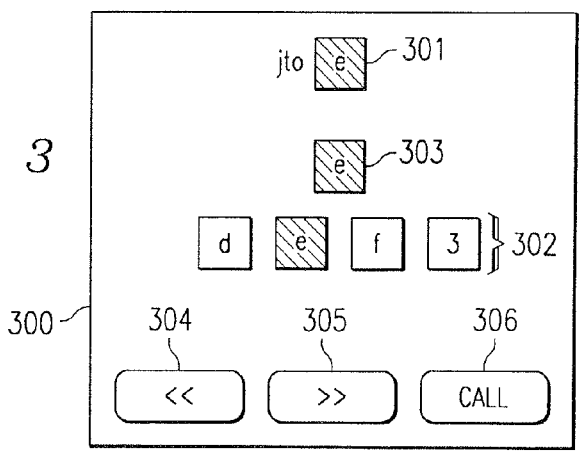
FIG. 3 illustrates one embodiment of the user interface for displaying selectable alphanumeric text.

FIG. 3 illustrates a user interface for displaying selectable alphanumeric text. The user interface, shown generally at 300, includes an input line 301 for displaying selected characters and a first display area 302 for displaying a group of selectable characters. Display 300 also includes a cursor 303 centrally positioned over display area 302 and may be operable to display a highlighted character within the group of characters. For example, if the first character displayed within display area 302 is highlighted, cursor 303 would display the same character. User interface 300 also includes scroll back soft-key 304 operable to move cursor 303 to a previous position and a scroll forward soft-key 305 operable to move cursor 303 to a next position. A call initiation key 306 is also provided to initiate communication using the reference displayed within input line 301. During use, user interface 300 may display selectable characters based on a mode (i.e. communication mode, display mode, etc.). Characters displayed within first display area 302 may be accessed using scroll back soft-key 304 and/or scroll forward soft-key 306. For example, a user may scroll to a character displayed within the third position first display area 302 and cursor 303 may be updated accordingly.

Figure 4:
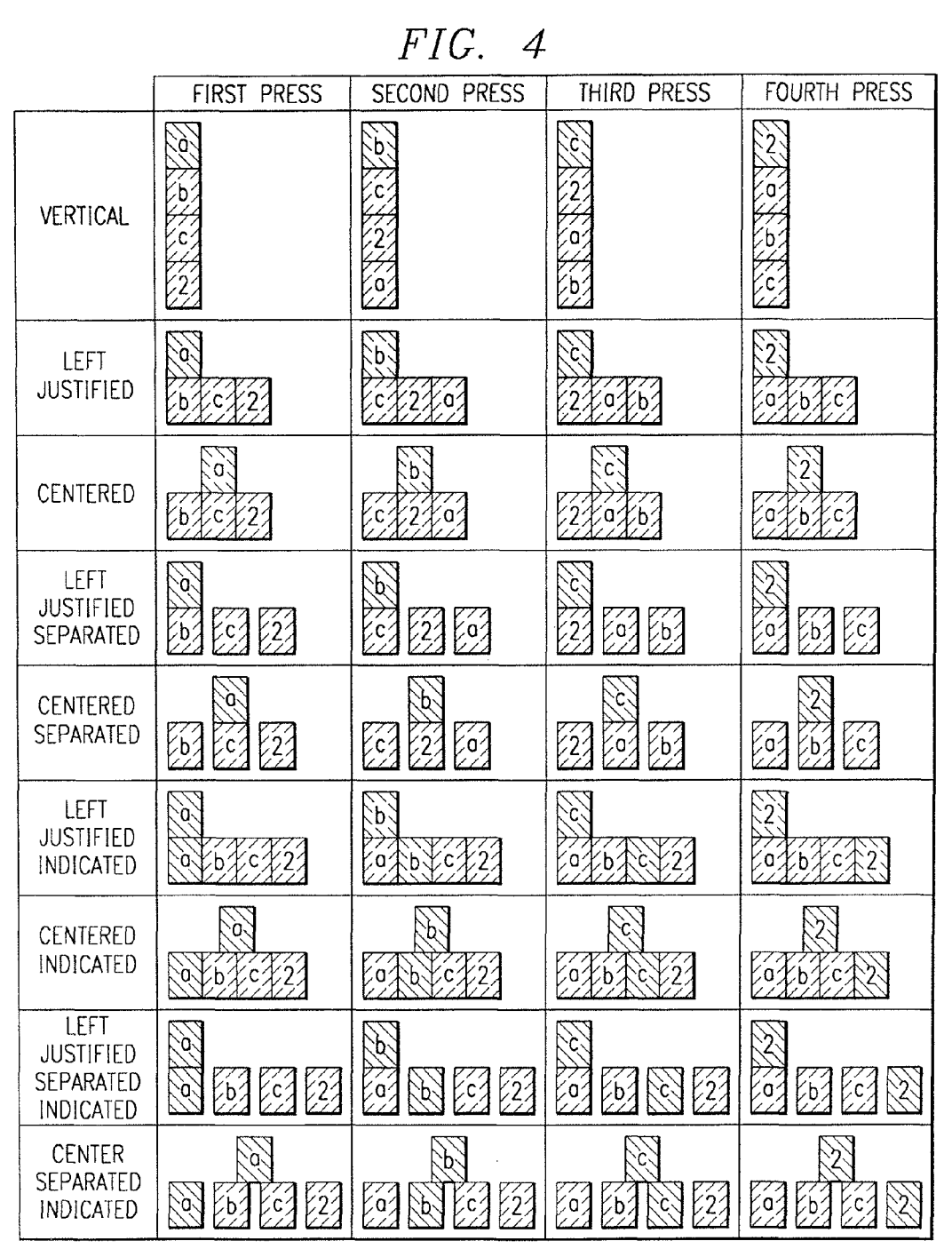

FIG. 4 illustrates several display modes for displaying alphanumeric text within a user interface of a communication device. The display modes may be used with a user interface such as user interface 300 of FIG. 3 or other devices, suggestions, or user interfaces operable to display the display modes of FIG. 4.

The display modes may be selected by a user, a system, a device, etc. and may be used to display alphanumeric text associated with a user selecting a key on a keypad, keyboard, or other input devices. A user may scroll or access the display and characters and a cursor and/or highlighted area may be updated in response to a user selecting a key or scroll button. For example, a user may access the second position of the displayed group of characters by depressing the same key twice.

Several examples of display modes which may be selected include a vertical display mode for displaying characters in a vertical orientation, a left-justified display mode operable to display a group of characters with a highlighted region for displaying a selectable character and rotating characters sequentially within a' static highlighted region.

A centered display mode may be used in a similar manner as the left-justified display mode centering a cursor over a group of characters and displaying a selectable character within the cursor. Left-justified separated and centered separated display modes may also be used and include separating character spacing within a group of characters.

A left-justified indicated display mode may be used to provide a highlighted region positioned over a leftmost portion of the group of characters. Similarly, a centered-justified indicated display mode may be used to provide a cursor substantially centered over the group of selectable characters. A left-justified segmented indicated display mode and a centered-segmented indicated display mode provide a group of characters displayed having spaces between the groups of characters.

Figure 5:
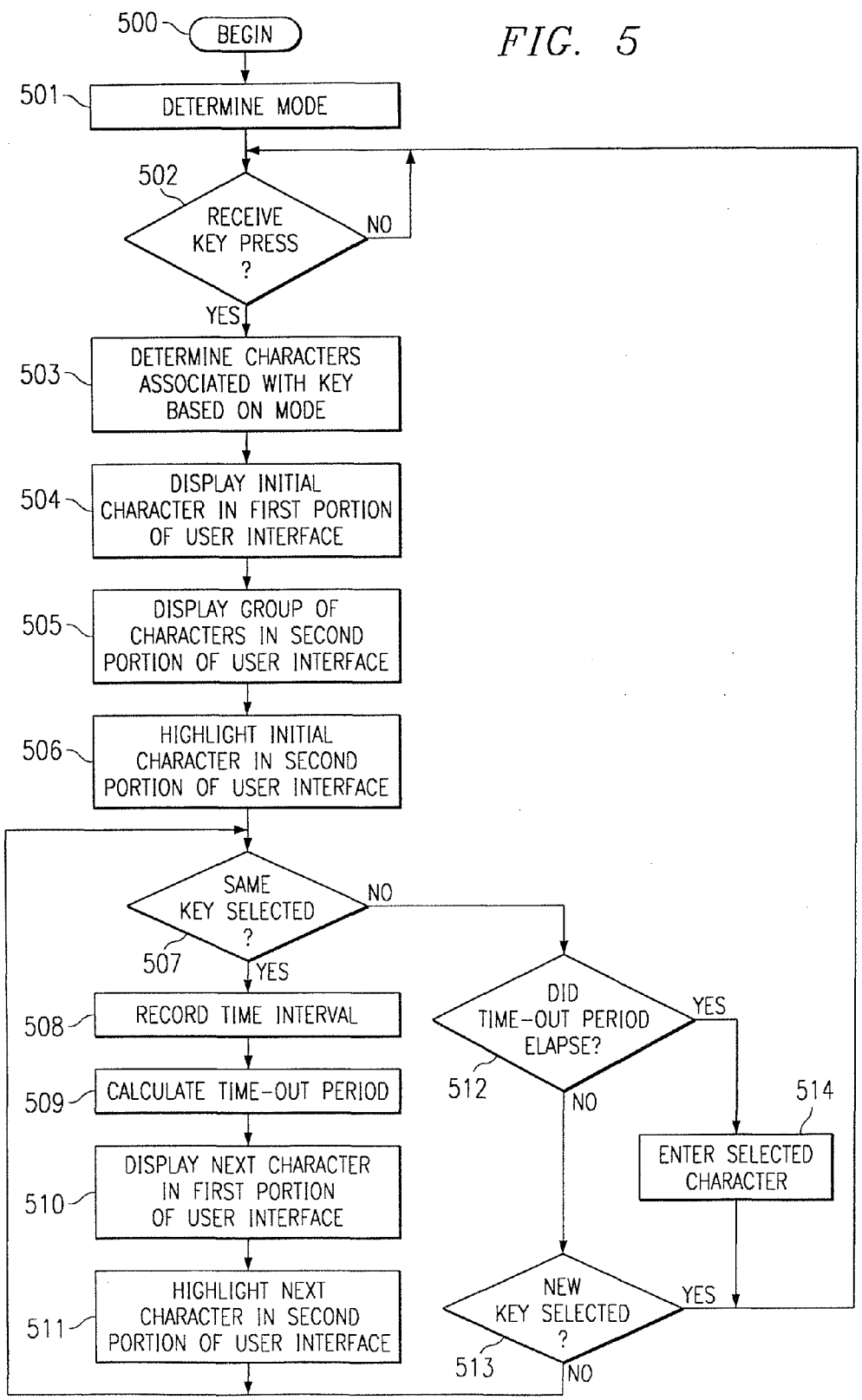
FIG. 5 illustrates one embodiment of a flow diagram of a method for displaying and selecting alphanumeric text within the user interface.

FIG. 5 illustrates a flow diagram of a method for displaying and selecting alphanumeric text within a user interface. The method may be used with the communication device illustrated in FIG. 1 or other devices or systems operable to use the method of FIG. 5. The method begins generally at step 500. At step 501, the method determines an operating mode associated with a communication device. For example, the method may determine a display mode for displaying characters within a user interface. One example may include horizontally displaying alphanumeric text within a user interface. Upon determining a mode, the method proceeds to step 502 where the method determines if a key has been selected for accessing alphanumeric text. For example a user may select a "#" key on a keypad to access alphanumeric text. If a user does not select a key, the method proceeds again to step 502. If a key has been selected, the method proceeds to step 503 where the method determines a group of characters associated with the selected key based on the determined mode. For example, if a user selects the 7 key on a keypad, the method may determine the characters "p q r 7" are associated with the selected key and a determined mode.

Upon determining the group of characters, the method proceeds to step 504 where the method displays an initial character of the character group within a first portion of a user interface. The method displays the group of characters in a second portion of the user interface at step 505. For example, the method may display the group of characters as horizontally segmented centrally positioned under the first portion of the user interface. The method then proceeds to step 506 where the method highlights the first character in the second portion of the user interface.

Upon highlighting the first character in the second portion, the method proceeds to step 507 where the method determines if the same key or a scroll button has been selected. If the same key or scroll button has been selected, the method proceeds to step 508 where the method records a time interval between selection of the key and/or the scroll button. The method then proceeds to step 509 where the method calculates a time-out period associated with the newly recorded time interval. For example, the method may employ an algorithm to calculate an average time between selecting or scrolling the displayed characters. The method then proceeds to step 510 where the method displays the next (or previous) character in the first portion of a user interface and to step 511 where the method highlights the next (or previous) character within the group of characters displayed in the second portion of the user interface. The method then proceeds to step 507 where the method determines if the same key is selected.

If at step 507, the same key is not selected (or scroll button not used) the method proceeds to step 512 where the method determines if a time-out period for displaying the character has elapsed. If the time-out period has elapsed, the method proceeds to step 514 where the method enters the highlighted character and to step 502 to receive the next key selection. If at step 512, the time-out period has not elapsed the method proceeds to step 513 to determine if a new key has been selected. If a new key has been selected, the method proceeds to step 503 where the method determines a group of characters based on the selected key and a mode. If at step 513 a new key is not selected, the method proceeds to step 507 to determine if the same key is selected.

In one embodiment, a user may enter or select a character displayed within a user interface. For example, a user may select an "enter" key operably associated with a user interface to select a highlighted character. As such, the method of FIG. 5 may be modified to update a time-out period based on the user entering the highlighted character. For example, a user may repeatedly select a key to scroll the characters displayed within the user interface and subsequently select and "enter" key to select a highlighted character. An algorithm may then be used to calculate a new time period based on the user accessing a character within the group of characters and selecting a character using an "enter" key.

Although the present invention has been described with several embodiments, a myriad of changes, variations, alterations, transformations, and modifications may be suggested to one skilled in the art, and it is intended that the present invention encompass such changes, variations, alterations, transformations, and modifications as fall within the scope of the appended claims.

What is claimed is:

1. A method, comprising:
   receiving a first key selection;
   determining a context of the first key selection;
   selecting a group of characters based on the determined context and associated with the first key selection;
   selecting a display mode based on the determined context, wherein the display mode corresponds to an orientation of the group of characters; and
   displaying the group of characters based on the selected display mode within a first portion of a user interface.

2. The method of claim 1, wherein the context is a communication mode.

3. The method of claim 2, wherein:
the communication mode is a mode accessing a uniform resource locator (URL); and
the group of characters based on the determined context is associated with a URL communication address.

4. The method of claim 1, further comprising:
receiving a second key selection, the second key selection associated with the displayed group of characters;
determining a second context of the second key selection, the second context being different than the context of the first key selection;
selecting a second group of characters based on the second determined context and associated with the second key selection; and
displaying the second group of characters.

5. The method of claim 1, wherein the group of characters displayed within a first portion is only a first portion of the group of characters.

6. The method of claim 5, further comprising:
determining an amount of time that has elapsed since the first key selection; and
when the amount of time is greater than a time-out period, automatically displaying a second portion of the group of characters.

7. A user interface, comprising:
a processor operable to:
receive a first key selection;
determine a context of the first key selection; and
select a group of characters based on the determined context and associated with the first key selection;
select a display mode based on the determined context, wherein the display mode corresponds to an orientation of the group of characters; and
a first display portion configured to display the group of characters based on the selected display mode within a first portion of the user interface.

8. The user interface of claim 7, wherein the context is a communication mode.

9. The user interface of claim 8, wherein:
the communication mode is a mode accessing a uniform resource locator (URL); and
the group of characters based on the determined context is associated with a URL communication address.

10. The user of interface of claim 7, wherein:
the processor is further operable to:
receive a second key selection, the second key selection associated with the displayed group of characters;
determine a second context of the second key selection, the second context being different than the context of the first key selection; and
select a second group of characters based on the second determined context and associated with the second key selection; and the first display portion is further configured to display the second group of characters.

11. The user interface of claim 7, wherein the group of characters displayed within a first portion is only a first portion of the group of characters.

12. The user interface claim 11, wherein:
the processor is further operable to determine an amount of time that has elapsed since the first key selection; and
the first display portion is further configured to automatically display a second portion of the group of characters when the amount of time is greater than a time-out period.

13. A non-transitory computer-readable medium comprising logic, the logic, when executed by a processor, operable to:
receive a first key selection;
determine a context of the first key selection;
select a group of characters based on the determined context and associated with the first key selection;
select a display mode based on the determined context, wherein the display mode corresponds to an orientation of the group of characters; and
display the group of characters based on the selected display mode within a first portion of a user interface.

14. The computer-readable medium of claim 13, wherein the context is a communication mode.

15. The computer-readable medium of claim 14, wherein:
the communication mode is a mode accessing a uniform resource locator (URL); and
the group of characters based on the determined context is associated with a URL communication address.

16. The computer-readable medium of claim 13, wherein the logic is further operable to:
receive a second key selection, the second key selection associated with the displayed group of characters;
determine a second context of the second key selection, the second context being different than the context of the first key selection;
select a second group of characters based on the second determined context and associated with the second key selection; and
display the second group of characters.

17. The computer-readable medium of claim 13, wherein the group of characters displayed within a first portion is only a first portion of the group of characters; and
the logic is further operable to:
determine an amount of time that has elapsed since the first key selection; and
automatically display a second portion of the group of characters when the amount of time is greater than a time-out period.

* * * * *